(12) United States Patent
Xie et al.

(10) Patent No.: US 6,621,954 B1
(45) Date of Patent: Sep. 16, 2003

(54) PRECISION OPTICAL FILTER WITH A BALL-END JOINT

(75) Inventors: Ping Xie, San Jose, CA (US); Kevin Zhang, San Jose, CA (US); Robert Burn, III, Woodside, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 09/713,634

(22) Filed: Nov. 14, 2000

(51) Int. Cl.$^7$ .................................................. G02B 6/32
(52) U.S. Cl. ........................................................ 385/33
(58) Field of Search ............................. 385/31, 33, 34, 385/35, 32

(56) References Cited

U.S. PATENT DOCUMENTS

| | | | |
|---|---|---|---|
| 5,291,571 A | 3/1994 | Kunikane et al. | 385/93 |
| 5,420,949 A | 5/1995 | Arima et al. | 385/43 |
| 5,689,578 A | 11/1997 | Yamauchi et al. | 385/123 |
| 5,949,941 A | 9/1999 | DiGiovanni | 385/127 |
| 6,160,933 A * | 12/2000 | Laude | 385/31 |
| 6,400,867 B1 * | 6/2002 | Liu | 385/33 |

FOREIGN PATENT DOCUMENTS

| | | |
|---|---|---|
| EP | 0123237 A | 10/1984 |
| EP | 0939325 A | 9/1999 |
| JP | 09-015447 | 1/1997 |
| JP | 10-186164 A | 7/1998 |

* cited by examiner

Primary Examiner—Javaid H. Nasri
(74) Attorney, Agent, or Firm—Workman Nydegger

(57) ABSTRACT

A portion of an optical device is disclosed. In one aspect of the present invention, the device comprises a cylinder formed about an axis having first and second ends, the second end being formed so as to define a segment of an inward-facing concave spherical surface. A module is provided defining a cylinder formed about the axis and having first and second ends and an optical element disposed therein about the axis. The first end of the module is formed so as to define a segment of an outward-facing convex spherical surface, and the convex surface is complimentary in shape to the concave surface. The complimentary concave and convex surfaces of the cylinder and the module are mated so as to allow the optical element to be aligned about a plane forming a predetermined angle with the axis.

33 Claims, 8 Drawing Sheets

Present invention

Present invention

Present invention

Present invention

Present invention

PRECISION OPTICAL FILTER WITH A BALL-END JOINT

BACKGROUND OF THE INVENTION

1. Field of the Invention

The present invention relates generally to fiber optics. In particular, the present invention relates to a precision optical filter with a ball-end joint.

2. The Prior Art

Background

Fiber optic communication systems are largely responsible for the recent expansion of bandwidth in communications systems such as the Internet. Much of this bandwidth expansion is being accomplished through the multiplexing of many. channel of optical signals onto a single optical fiber. In typical applications today, as many as 128 semiconductor lasers may share a single fiber through a process known as "wavelength division multiplexing" (WDM). A Wavelength Division Multiplexer (WDM) used to accomplish this process is typically a passive optical device configured to combine multiple channels of optical information onto a single optical fiber (multiplexing), or to separate multiple channels of optical information contained in a single optical fiber onto separate optical fibers (demultiplexing).

Much attention today is being given to Dense Wavelength Division Multiplexers (DWDM) because of the requirement to divide signals that are spaced very close together in wavelength. Current International Telecommunications Union (ITU) specifications call for channel separations of approximately 0.4 nm. Using such channel separations, a single fiber may carry as many as 128 channels.

Because of this close channel separation, it is desirable to fabricate DWDMs with excellent stability over both time and temperature. It is desirable, among other things, that the insertion loss of a DWDM may not vary more than +/−0.5 dB over the temperature range of 0°–70° C. Additionally, since a DWDM usually comprises many filters cascaded together. For example, an 8-channel DWDM may comprise 8 cascaded filters. Thus, at the final stage of such an 8-channel DWDM, any variation introduced by a particular channel may be multiplied by as much as eight times. Accordingly, it is desirable to keep any such variations to a minimum. However, it is a challenge for typical DWDMs produced today to meet such standards.

FIG. 1 shows a DWDM 100 of the prior art. DWDM 100 includes a first collimator 102which further includes a ferrule 104 and a lens 106. Ferrule 104 further includes an incident fiber 110 and a reflecting fiber 112. Typically, lens 106 comprises a GRIN lens standard in the art. DWDM 100 further includes a thin-film filter 114 standard in the art. Additionally, DWDM 100 includes a second collimator 116, which also includes a lens 118 and a ferrule 120 having a transmitting fiber 122. During fabrication, first collimator 102, thin film filter 114, and second collimator 116 must be precisely aligned about an axis 106 to function properly. A finished DWDM as shown in FIG. 1 is typically 5 mm in diameter and 40 mm in length.

FIGS. 2A, 2B, and 2C are diagrams which provide a brief overview of the operation of a DWDM. FIGS. 2A–2C are graphical diagrams having a transmission axis T versus wavelength λ. FIG. 2A shows a plurality of channels incident to a DWDM in which it is desired to isolate channel $\lambda_0$.

By way of example, the signals of FIG. 2A may be applied to incident fiber 110 of DWDM 100 of FIG. 1. If the DWDM 100 of FIG. 1 is aligned properly, the incident signals will be optically coupled through lens 106 to the filter 114. Filter 114 is coated with a multi-layer coating standard in the art to reflect all of the incident signal into the reflecting fiber 112, except for the channel $\lambda_0$, as is shown in FIG. 2B. Furthermore, filter 114 will transmit the channel $\lambda_0$ through lens 118 and ultimately to transmitting fiber 122, as shown in FIG. 2C.

However, as mentioned above, the DWDM must be properly aligned for the results of FIGS. 2A–2C to occur. The position of the thin-film filter is critical to the proper operation of the DWDM, with acceptable errors in orientation being in the order of 1 milliradian or 1 micrometers. Two challenges face manufacturers of DWDMs: first, the DWDM must be precisely aligned and secured during manufacturing; and, secondly, the DWDM must be able to tolerate the temperature ranges imposed by environmental and operational conditions and tested through the Bellcore process.

FIG. 3 is a detail diagram of a prior art diagram of a prior art DWDM. FIG. 3 focuses on how the thin film filter 114 of DWDM 100 shown in FIG. 1 is secured in prior art devices. During fabrication, the filter 114 is aligned such that the incident signals are properly reflected and transmitted as described above. When the desired location of the filter 114 is determined, it is typically secured with epoxy (shown as spots of epoxy 300) to the collimator 102. It should be noted that FIG. 3 is not drawn to scale and the tilt of the filter is exaggerated for illustrative purposes.

However, the process of securing the filter with epoxy as shown in FIG. 3 has been shown to introduce certain deficiencies in the operation of the DWDM. Often, when the filter is secured in place, there is a significant gap between the filter and the collimator, and when the epoxy is applied to the filter, the epoxy spreads and dries in an uneven manner. This uneven distribution of epoxy can lead to deficiencies in the final product. For example, epoxy has been shown to expand and contract with temperature changes, thus causing the DWDM to shift operationally with temperature. Naturally, any temperature deviations will reflect negatively in the Bellcore tests and performance in the field. These deviations can be exaggerated if the epoxy is distributed nonuniformly. Additionally, it has been shown that when epoxy makes contact with the delicate surface of a thin-film filter, the areas proximate to the epoxy may suffer performance degradations.

Hence, there is a need for a method and apparatus for aligning and securing a thin-film filter within an optical device which overcomes the problems of the prior art.

BRIEF DESCRIPTION OF THE INVENTION

The invention satisfies the above needs. The present invention relates generally to fiber optics. In particular, the present invention relates to a precision optical filter with a ball-end joint.

A portion of an optical device is disclosed. In one aspect of the present invention, the device comprises a cylinder formed about an axis having first and second ends, the second being formed so as to define a segment of an inward-facing concave spherical surface;

a module defining a cylinder formed about the axis and having first and second ends, the module having an optical element disposed therein about the axis, the first end of the module being formed so as to define a segment of an outward-facing convex spherical surface, the convex surface being complimentary in shape to the concave surface; and wherein the complimentary concave and convex surfaces of the cylinder and the module being mated so as to allow the optical element to be aligned about a plane forming a predetermined angle with the axis.

Additional aspects of the present invention include the use of the present invention in optical devices such as DWDMs.

A method for aligning an optical element is disclosed. In a preferred embodiment, the method comprises: providing a cylinder formed about an axis having first and second ends, the second end being formed so as to define a segment of an inward-facing concave spherical surface;

providing a module defining a cylinder formed about the axis and having first and second ends, the module having an optical element disposed therein between the first and second ends of the module about the axis, the first end of the module being formed so as to define a segment of an outward-facing convex spherical surface, the convex surface being complimentary in shape to the concave surface;

mating the complimentary concave and convex surfaces of the cylinder and the module; and wherein the optical element may be aligned about a plane forming a predetermined angle with the axis.

An optical device is disclosed. In a preferred embodiment, the device comprises: a first collimator, the first collimator formed about an axis and defining a cylinder having first and second ends, the first collimator further having a ferrule disposed in the first end of the collimator about the axis, a first lens disposed in the first collimator between the first and second ends about the axis, and the second end of the first collimator being formed so as to define a segment of an inward-facing concave spherical surface;

a module defining a cylinder formed about the axis and having first and second ends, the module having an optical element disposed therein between the first and second ends of the module about the axis, the first end of the filter module being formed so as to define a segment of an outward-facing convex spherical surface, the convex surface being complimentary in shape to the concave surface;

a second collimator, the second collimator formed about the axis and defining a cylinder having first and second ends, the second collimator further having a ferrule disposed in the second end of the collimator about the axis, a second lens disposed in the second collimator between the first and second ends about the axis, the second collimator being optically coupled to the module; and wherein the complimentary concave and convex surfaces of the first collimator and the module being mated so as to allow the optical element to be aligned about a plane forming a predetermined angle with the axis.

Additional aspects of the present invention include utilizing an optical element such as an optical filter such as a band pass filter, a long pass filter, a short pass filters, a selective filter, a GRIN lens, a spherical lens, or an aspherical lens. The present invention may also include a thin-film filter.

The present invention may also be used as a portion of a DWDM.

BRIEF DESCRIPTION OF THE DRAWING FIGURES

FIG. 1 is a diagram of a prior art DWDM.

FIGS. 2A, 2B, and 2C are graphical diagrams showing the operation of a DWDM.

DETAILED DESCRIPTION OF PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

Figure 4:
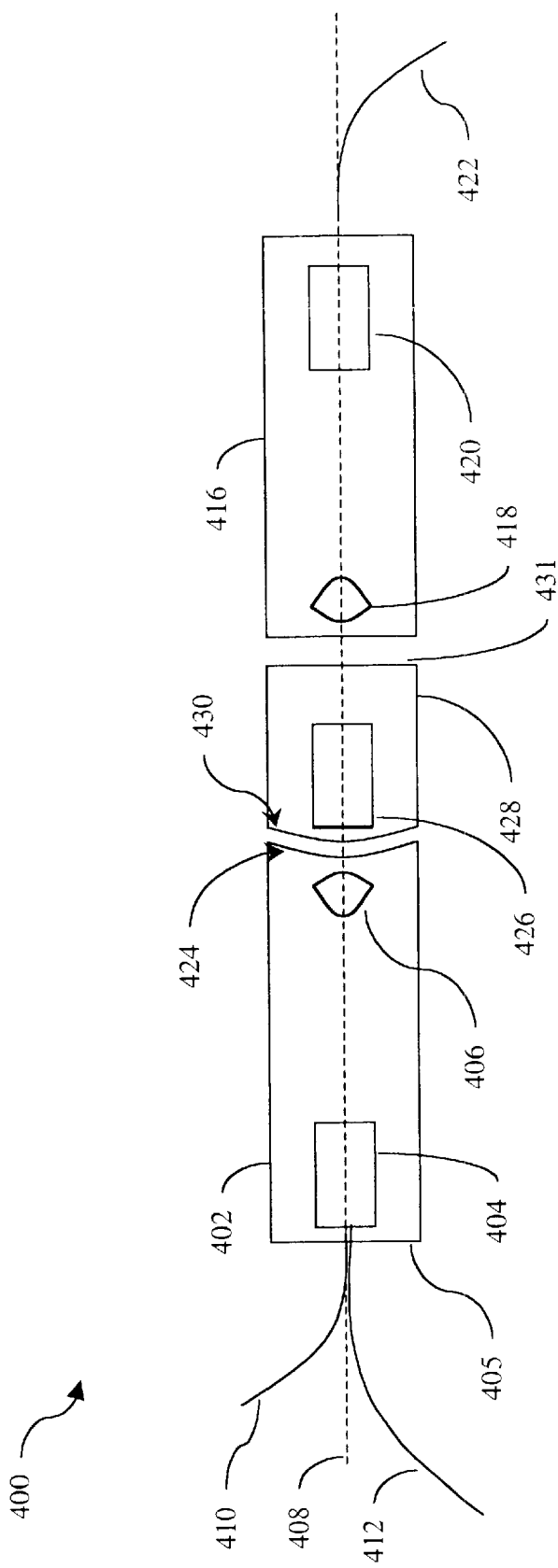
FIG. 4 is a diagram of a DWDM according to the present invention.

FIG. 4 is a diagram of an optical device 400 according to the present invention. It is contemplated that the present invention may be employed as both a multiplexer and a demultiplexer, depending on which direction light is launched into device 400. Hence, references to terms such as transmitting and reflecting herein are intended to be merely illustrative of a preferred embodiment and are not intended to restrict the scope of the present invention.

Optical device 400 includes a first collimator 402. First collimator 402 is preferably formed in a cylindrical shape about axis 408. First collimator 402 further has a first end 405 and a second end 424. In an exemplary non-limiting embodiment of the present invention, the elements may be fabricated from materials standard in the art, such as stainless steel.

First collimator 402 further includes a ferrule 404 comprising elements standard in the art, including an incident fiber 410 optically configured to receive incident optical signals, and a reflecting fiber 412 optically configured to transmit optical signals reflected by device 400. In an exemplary non-limiting embodiment of the present invention, ferrule 404 is disposed between first end 405 and second end 424 along axis 408.

First collimator 402 further includes a lens 406. In an exemplary non-limiting embodiment of the present invention, lens 406 is disposed between first end 405 and second end 424 along axis .408 and is configured to optically couple signals with ferrule 404. It is contemplated that many different types of lenses known in the art may be employed in the present invention, such as the GRIN lenses mentioned above. It is contemplated that a wide variety of lenses known in the art may be employed in the present invention. In an exemplary non-limiting embodiment of the present invention, aspherical lenses are employed in the present invention.

Optical device 400 further includes a filter module 428. Filter module 428 is preferably formed in a cylindrical shape about axis 408, and has a first end 430 and a second end 431. Filter module 428 includes a thin-film filter 426 disposed therein. In an exemplary non-limiting embodiment of the present invention, the filter 426 is disposed between first end 430 and second end 431 about axis 408. It is contemplated that wide variety of optical elements known in the art may be employed in the present invention, such as GRIN lenses, spherical or aspherical lenses, band pass filters, long or short pass filters, or selective filters. In an exemplary non-limiting embodiment of the present invention, filter 426 is disposed proximate to first end 430 and is configured to optically couple signals with lens 406.

Optical device 400 includes a second collimator 416, which is preferably formed in a cylindrical shape about axis 408. Second collimator 416 further includes a ferrule 420 comprising elements standard in the art, including a transmitting fiber 410 optically configured to couple optical signals to device 400. In an exemplary non-limiting embodiment of the present invention, ferrule 404 is disposed within ferrule 420 along axis 408.

Device 400 further includes a lens 418. In an exemplary non-limiting embodiment of the present invention, lens 418 is disposed along axis 408 and is configured to optically couple signals with filter module 428. In an exemplary non-limiting embodiment of the present invention, lens 418 comprises an aspherical lens as described above.

As mentioned above, the alignment and securing of filter 426 is critical to the operation of an optical device. The present invention provides a novel and useful solution which allows the precise placement and alignment of filter 426. As can be seen by inspection of FIG. 4, second end 424 of first collimator 402 is formed so as to define a segment of an inward-facing concave spherical surface. Likewise, first end 430 of filter module 428 is formed so as to define a segment of an outward-facing convex spherical surface, with the convex surface being complimentary in shape to the concave surface. The concave and convex surfaces allow the filter to be precisely located, aligned, and secured in place with the collimator as will become more apparent shortly.

Figure 5:
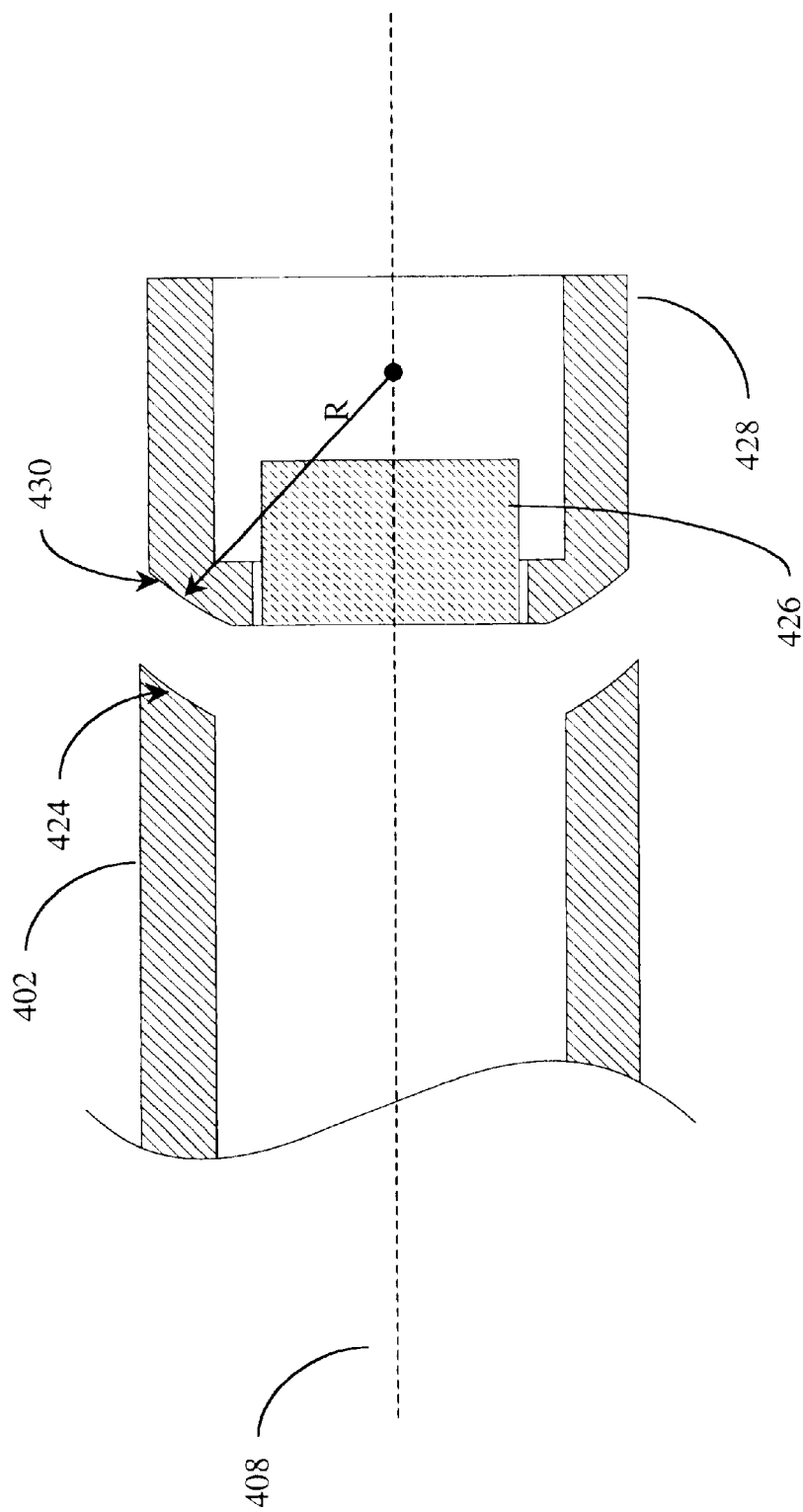
FIG. 5 is a detailed cross section diagram of a portion of an optical device according to the present invention.

FIG. 5 is a detailed cross-sectional diagram of a portion of an optical device. FIG. 5 focuses on the concave and convex surfaces. FIG. 5 includes the second end 424 of first collimator 402, and the first end 430 of filter 428. FIG. 5 shows filter 426 disposed within second end 424. As can be seen by inspection of FIG. 5, the material which forms the cylinder of first collimator 402 has been removed at second end 424 to form segments of an inward-facing spherical surface having radius of R. Likewise, as can be seen by inspection of FIG. 5, the material which forms the walls of filter module 428 at first end 430 has been removed to form segments of an outward-facing spherical surface having a radius of R.

Figure 1:
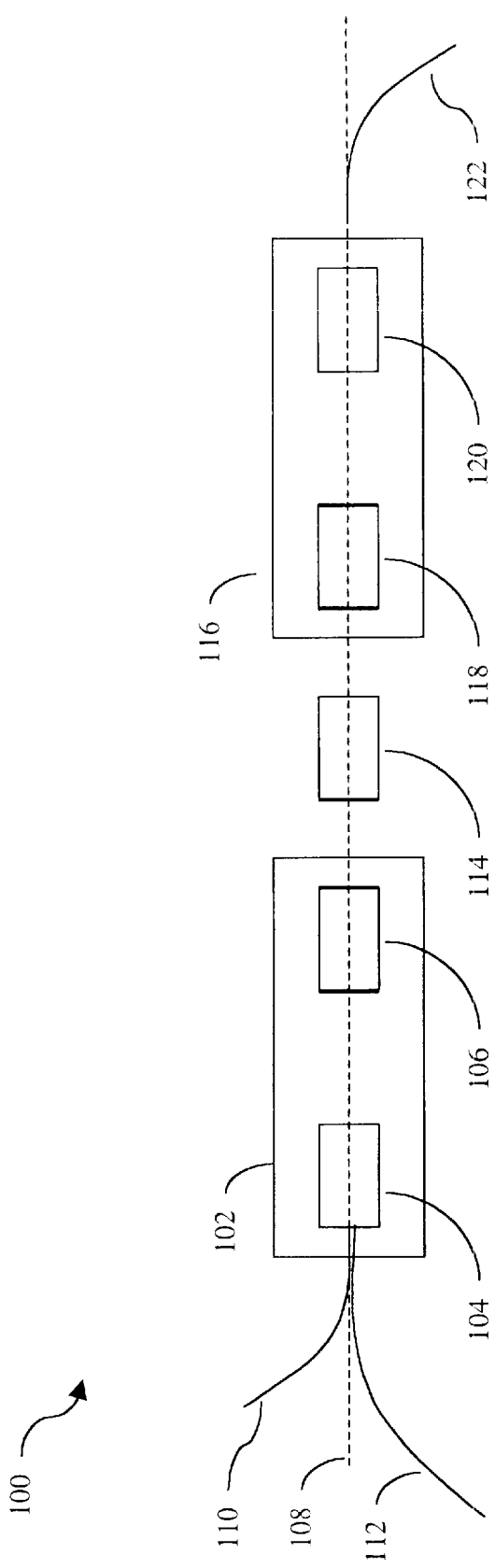
Figure 2C:
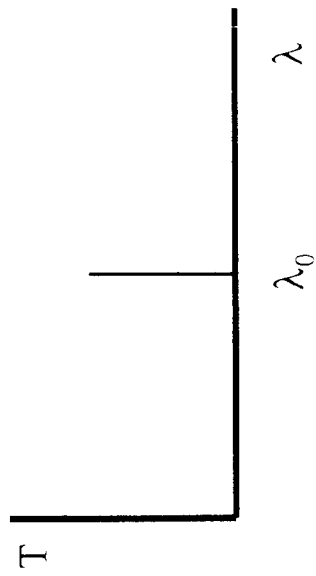
Figure 2A:
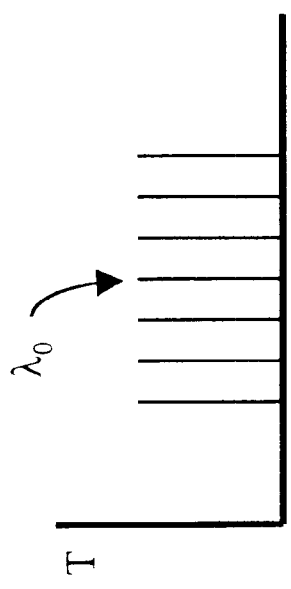
Figure 2B:
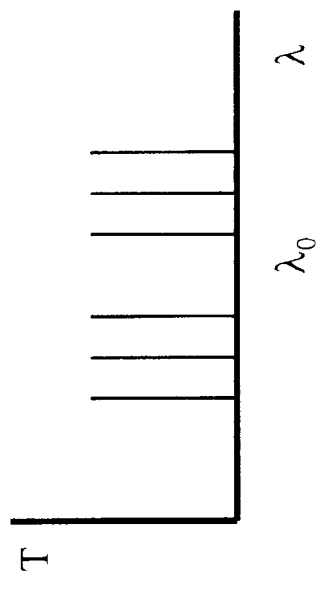
Figure 3:
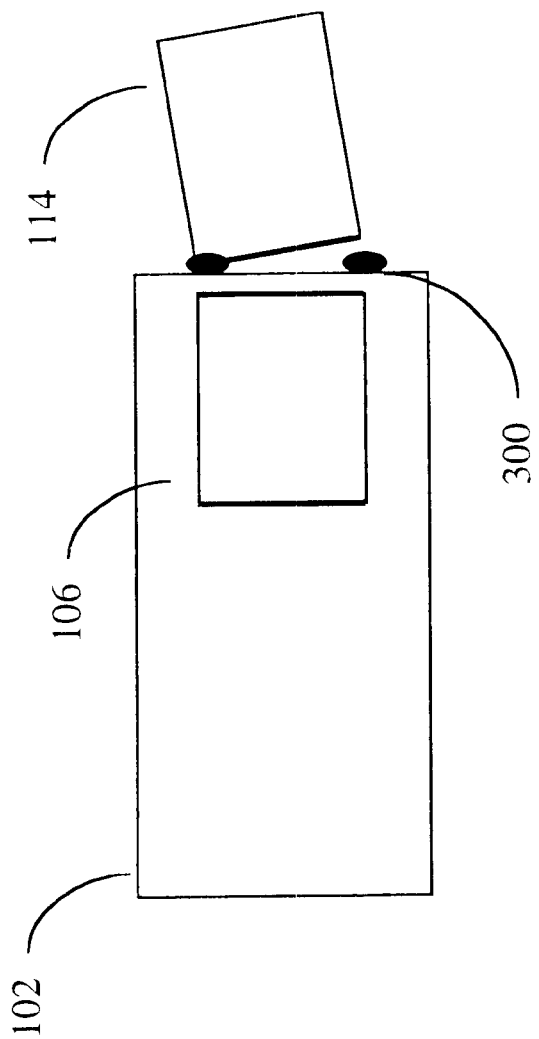
FIG. 3 is a detailed diagram of a prior art DWDM.

As mentioned above, there is a need to provide a better alignment and installation method which is easier to setup and align and provides better performance and temperature stability. With prior art devices, such as that shown in FIG. 3, the installation and alignment of the filter may take several minutes per device., since prior art devices may initially be far from alignment.

With the device of the present invention, when the filter module is placed in the first collimator, the filter module will have surface-to-surface contact with the first collimator. Because the surfaces of a preferred embodiment are spherical, components of the present invention are much closer to proper alignment at the beginning of the assembly process. By virtue of the fact that the surfaces of the filter module and first collimator are complimentary, the device according to the present invention is nearly self-aligning. Additionally, the substantial surface-to-surface contact of the components of the present invention remains throughout the alignment process, insuring precise alignment and securing of the present invention. When the module and collimator are angularly aligned, the two remain in surface-to-surface contact.

While the present discussion shows the optical device functioning as a DWDM, the present invention may be utilized wherever precise alignment of an optical element is needed. For example, any optical device that must be precisely aligned may benefit from the present invention. For example, any multiplexer or demultiplexer in which an optical element such as a filter must be precisely aligned will benefit from the present invention. Additionally, the design of the present invention may be utilized with other type of optical filters, such as longpass, shortpass, and wideband, etc.

Figure 6:
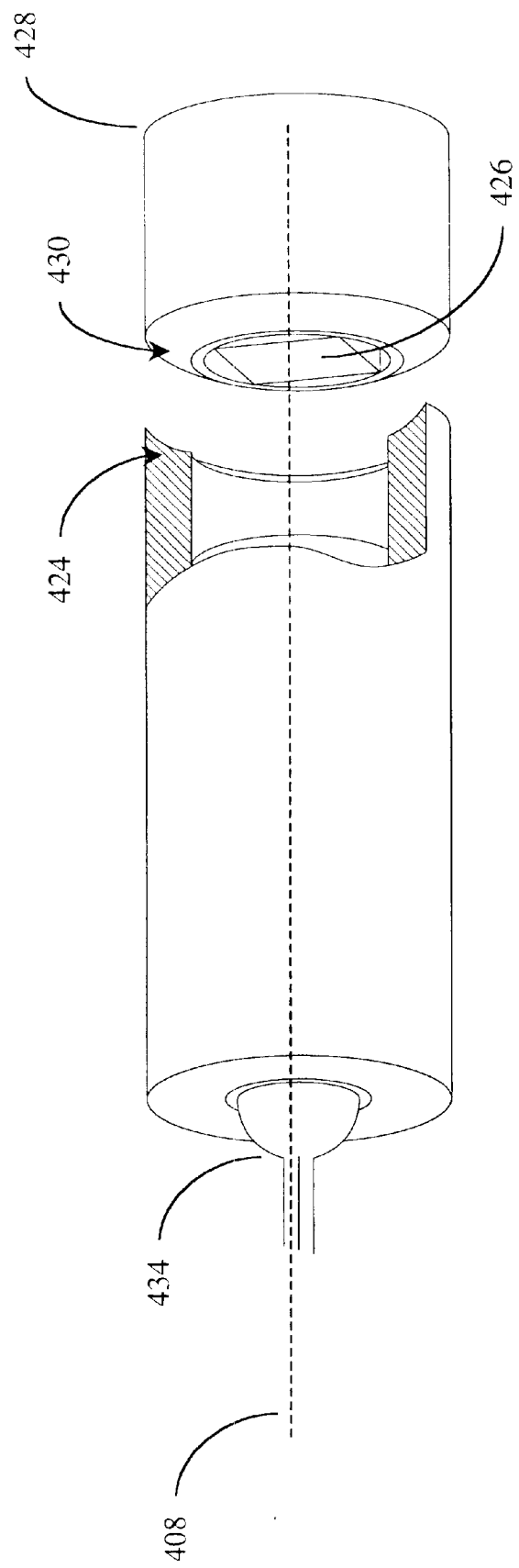
FIG. 6 is an isometric diagram of a portion of an optical device according to the present invention.

Referring now to FIG. 6, an isometric view of a portion of an optical device is shown, looking towards the first end of filter module 428 along axis 408. FIG. 6 also includes a cross section taken through second end 424 of first collimator 402. FIG. 6 also shows a ferrule 434 emanating from first collimator 402. Ferrule 434 may include incident fiber 410 and reflecting fiber 412.

FIG. 6 also shows how the material which forms the cylinder walls of first collimator 402 has been removed at second end 424 to form segments of an inward-facing spherical surface. Likewise, as can be seen by inspection of FIG. 6, the material which forms the walls of filter module 428 at first-end 430 has been removed to form segments of an outward-facing spherical surface. The isometric view of FIG. 6 also shows how the complimentary surfaces of the filter module and collimator allow the two to be mated.

Figure 7:
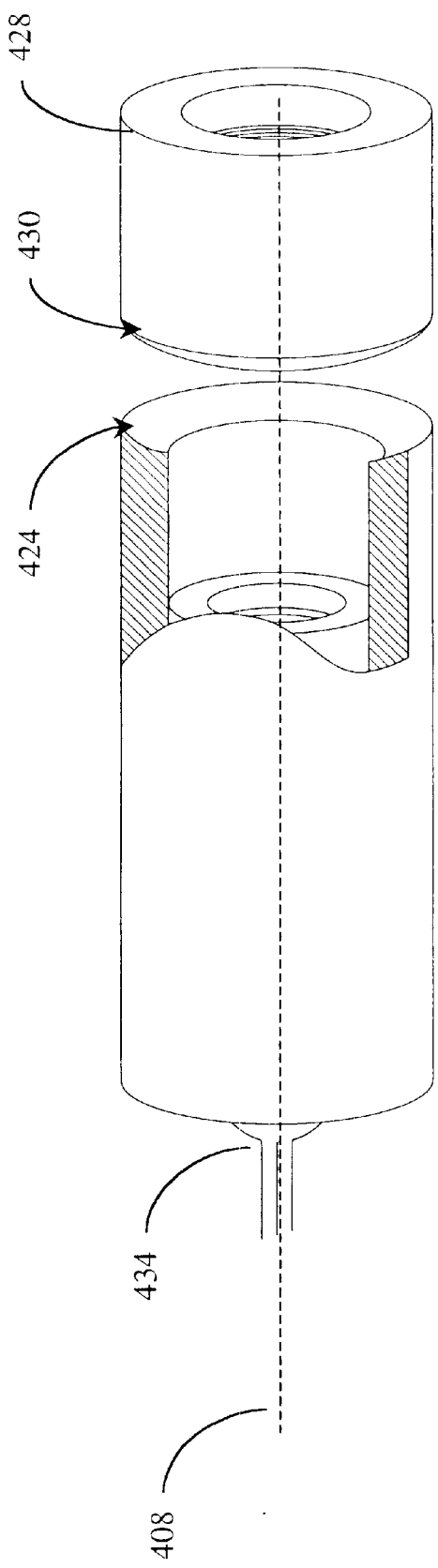
FIG. 7 is an isometric diagram of a portion of an optical device according to the present invention.

Referring now to FIG. 7, an isometric view of a portion of an optical device is shown, looking towards the second end of first collimator 402 along axis 408. FIG. 7 also includes a cross section taken through second end 424 of first collimator 402. FIG. 7 also shows a ferrule 434 emanating from first collimator 402.

FIG. 7. again shows how the material which forms the cylinder walls of first collimator 402 has been removed at second end 424 to form segments of an inward-facing spherical surface. Likewise, as can be seen by inspection of FIG. 7, the material which forms the walls of filter module 428 at first end 430 has been removed to form segments of an outward-facing spherical surface. The isometric view of FIG. 7 also shows how the complimentary surfaces of the filter module and collimator allow the two to be mated.

Figure 8:
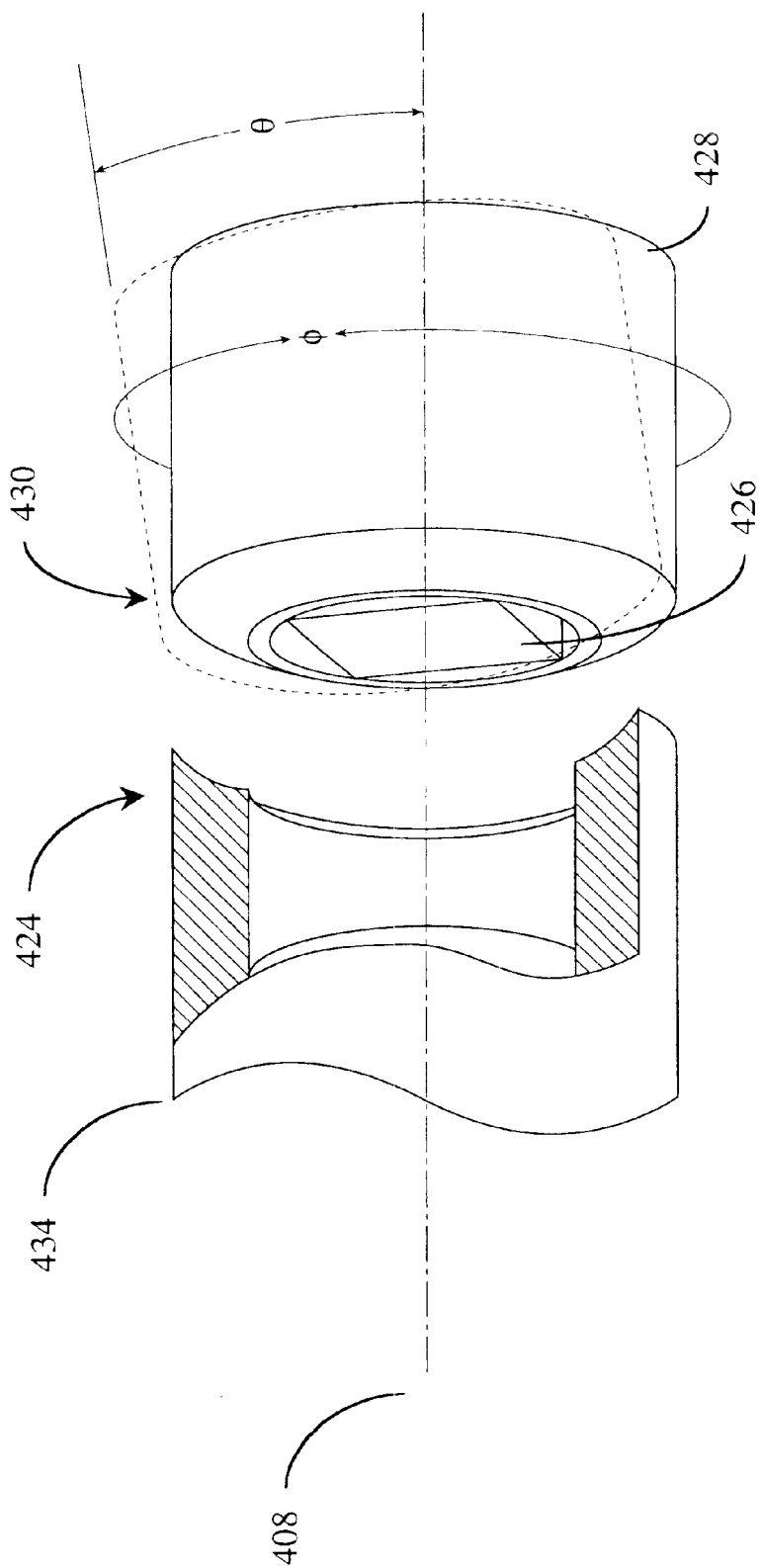
FIG. 8 is a detailed isometric diagram of a portion of an optical device according to the present invention.

Referring now to FIG. 8, an isometric view of the present invention is shown, illustrating the operational advantages of the present invention. FIG. 8 also includes a cross section of the first collimator 402.

FIG. 8 again shows how the material which forms the cylinder walls of first collimator 402 has been removed at second end 424 to form segments of an inward-facing spherical surface. Likewise, as can be seen by inspection of FIG. 8, the material which forms the walls of filter module 428 at first end 430 has been removed to form segments of an outward-facing spherical surface. The isometric view of FIG. 8 also shows how the complimentary surfaces of the filter module and collimator allow the two to be mated.

FIG. 8 provides an excellent illustration of the operation of the present invention. During manufacturing, it is contemplated that module 428 will be placed in a jig with its first end 430 facing upwards. Then, the first collimator 402 may be placed over module 428 with second end 424 facing downward. Thus, first end 430 of filter module 428 is mated with the second end 424 of first collimator 402 where the two may be moved relative to each other while still maintaining surface-to-surface contact. The operator may then precisely align the filter 426 by sliding the filter module 428 within the ball-end joint formed by the complimentary surfaces of first end 430 and second end 424.

As mentioned above, the alignment of filter 426 is critical to the operation of optical devices. As can be seen by inspection of FIG. 8, the face of filter 426 forms a plane which intersects axis 408. Thus, according to the present invention the face of the filter 426 is afforded two degrees of freedom while still maintaining surface-to-surface contact. Thus, the plane formed by the face of filter 426 may be aligned with respect to axis 408 at a predetermined angle. More specifically, filter module 428 may be moved in two manners to align filter 426. First, filter module 428 may be tilted with respect to axis 408 by an angle θ. Secondly, filter module 428 may be rotated about axis 408 by an angle φ. In a presently preferred embodiment, the module may be rotated through one or both angles. This ability to maneuver the filter 426 in one or two degrees of freedom is a significant advance over prior art devices. For example, the alignment on the filter angle is controlled to within 0.1 mrad accuracy In order to find the specific angle of alignment, one need only to scan through +/−1 degree in two dimensions of rotation.

Additionally, once the desired position and proper alignment has been found, the module may be secured to the collimator by using adhesive means known in the art, such as solder or epoxy. However, this may be accomplished without the need to apply epoxy to the optical element directly, since the element resides within its module. This avoids the disadvantages of applying epoxy to the optical element as noted above.

Additionally, the module may be secured in place a manner such that epoxy may be applied in a uniform manner due to the surface-to-surface contact which is maintained through the present invention.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A portion of an optical device comprising:
    a cylinder formed about an axis having first and second ends, said cylinder having a lens disposed therein between said first and second ends said second end being formed so as to define a segment of an inward-facing concave spherical surface;
    a module defining a cylinder formed about said axis and having first and second ends, said module having an optical filter element disposed therein about said axis, said first end of said module being formed so as to define a segment of an outward-facing convex spherical surface, said convex surface being complimentary in shape to said concave surface; and
    wherein said complimentary concave and convex surfaces of said cylinder and said module being mated so as to allow said optical element to be aligned about a plane forming a predetermined angle with said axis.

2. The device of claim 1, wherein said optical filter is chosen from the group consisting of a band pass filter, a long pass filter, a short pass filters, a selective filter, and said lens is chosen from the group consisting of a GRIN lens, a spherical lens, and an aspherical lens.

3. The device of claim 1, wherein said optical filter comprises a thin-film filter.

4. The device of claim 1, wherein said portion of said optical device comprises a portion of a DWDM.

5. The device of claim 1, wherein said cylinder comprises a collimator.

6. The device of claim. 5, wherein said collimator further comprises an optical fiber disposed in said first end.

7. The device of claim 6, wherein said collimator further comprises a lens disposed between said first and second ends.

8. The device of claim 7, wherein said lens comprises an aspherical lens.

9. The device of claim 1, wherein said device operates as an optical multiplexer.

10. The device of claim 1, wherein said device operates as an optical demultiplexer.

11. The device of claim 1, wherein said complimentary surfaces remain substantially in surface-to-surface contact while being aligned.

12. A method for aligning an optical element comprising:
    providing a cylinder formed about an axis having first and second ends, said cylinder having a lens disposed therein between said first and second ends, said second end being formed so as to define a segment of an inward-facing concave spherical surface;
    providing a module defining a cylinder formed about said axis and having first and second ends, said module having an optical filter element disposed therein between said first and second ends of said module about said axis, said first end of said module being formed so as to define a segment of an outward-facing convex spherical surface, said convex surface being complimentary in shape to said concave surface;
    mating said complimentary concave and convex surfaces of said cylinder and said module; and
    wherein said optical element may be aligned about a plane forming a predetermined angle with said axis.

13. The method of claim 12, wherein said optical filter is chosen from the group consisting of a band pass filter, a long pass filter, a short pass filters, a selective filter, and said lens is chosen from the group consisting of a GRIN lens, a spherical lens, and an aspherical lens.

14. The method of claim 12, wherein said optical filter comprises a thin-film filter.

15. The method of claim 12, wherein said optical device comprises a portion of a DWDM.

16. The method of claim 12, wherein said collimator further comprises an optical fiber disposed in said first end.

17. The method of claim 16, wherein said collimator further comprises an optical fiber disposed in said first end.

18. The method of claim 17, wherein said collimator further comprises a lens disposed between said first and second ends.

19. The method of claim 18, wherein said lens comprises an aspherical lens.

20. The method of claim 12, wherein said device operates as an optical multiplexer.

21. The method of claim 12, wherein said device operates as an optical demultiplexer.

22. The method of claim 12, wherein said complimentary surfaces remain substantially in surface-to-surface contact while being aligned.

23. An optical device comprising:
    a first collimator, said first collimator formed about an axis and defining a cylinder having a first and second ends, said first collimator further having a ferrule disposed in said first end of said collimator about said axis, a first lens disposed in said first collimator between said first and second ends about said axis, and said second end of said first collimator being formed so as to define a segment of an inward-facing concave spherical surface;
    a module defining a cylinder formed about said axis and having first and second ends, said module having an optical filter disposed therein between said first and second ends of said module about said axis, said first end of said module being formed so as to define a segment of an outward-facing convex spherical surface, said convex surface being complimentary in shape to said concave surface;

a second collimator, said second collimator formed about said axis and defining a cylinder having first and second ends, said second collimator further having a ferrule disposed in said second end of said collimator about said axis, a second lens disposed in said second collimator between said first and second ends about said axis, said second collimator being optically coupled to said module; and wherein said complimentary concave and convex surfaces of said first collimator and said module being mated so as to allow said optical element to be aligned about a plane forming a predetermined angle with said axis.

24. The device of claim 23, wherein said optical, filter is chosen from the group consisting of a band pass filter, a long pass filter, a short pass filters, a selective filter, and said lens is chosen from the group consisting of a GRIN lens, a spherical lens, and an aspherical lens.

25. The device of claim 23, wherein said optical filter comprises a thin-film filter.

26. The device of claim 23, wherein said first lens comprises an aspherical lens.

27. The device of claim 23, wherein said second lens comprises an aspherical lens.

28. The device of claim 23, wherein said device operates as an optical multiplexer.

29. The device of claim 23, wherein said device operates as an optical demultiplexer.

30. The device of claim 23, wherein said complimentary surfaces remain substantially in surface-to-surface contact while being aligned.

31. A portion of an optical device comprising:

a cylinder formed about an axis having first and second ends, said cylinder having a lens disposed therein between said first and second ends, said second being formed so as to define a segment of an inward-facing concave spherical surface;

a module defining a cylinder formed about said axis and having first and second ends, said module having an optical filter disposed therein between said first and second ends of said module about said axis, said first end of said module being formed so as to define a segment of an outward-facing convex spherical surface, said convex surface being complimentary in shape to said concave surface;

said complimentary concave and convex surfaces of said first collimator and said module being mated.:so as to allow said optical element to be aligned about a plane forming a predetermined angle with said axis; and said concave and said convex surfaces being permanently affixed after said alignment.

32. A method for aligning an optical element comprising:

providing a cylinder formed about an axis having first and second ends, said cylinder having a lens disposed therein between said first and second ends, said second being formed so as to define a segment of an inward-facing concave spherical surface;

providing a module defining a cylinder formed about said axis and having first and second ends, said module having an optical filter disposed therein between said first and second ends of said module about said axis, said first end of said module being formed so as to define a segment of an outward-facing convex spherical surface, said convex surface being complimentary in shape to said concave surface;

mating said complimentary concave and convex surfaces of said first collimator and said module;

aligning said optical element about a plane forming a predetermined angle with said axis; and permanently affixing said complimentary concave and convex surfaces of said first collimator and said module.

33. An optical device comprising:

a first collimator, said first collimator formed about an axis and defining a cylinder having first and second ends, said first collimator further having a ferrule disposed in said first end of said collimator about said axis, a first lens disposed in said first collimator between said first and second ends about said axis, and said second end of said first collimator being formed so as to define a segment of an inward-facing concave spherical surface;

a module defining a cylinder formed about said axis and having first and between said first and second ends of said module about said axis, said first end of said module being formed so as to define a segment of an outward- second ends, said module having an optical filter disposed therein facing convex spherical surface, said convex surface being complimentary in shape to said concave surface;

a second collimator, said second collimator formed about said axis and defining a cylinder having first and second ends, said second collimator further having a ferrule disposed in said second end of said collimator about said axis, a second lens disposed in said second collimator between said first and second ends about said axis, said second collimator being optically coupled to said module; and said complimentary concave and convex surfaces of said cylinder and said module being mated so as to allow said optical element to be aligned about a plane forming a predetermined angle with said axis; and said concave and said convex surfaces being permanently affixed after said alignment.

* * * * *